(12) United States Patent
Kobayashi et al.

(10) Patent No.: US 8,857,576 B2
(45) Date of Patent: Oct. 14, 2014

(54) DISC BRAKE APPARATUS

(71) Applicant: Akebono Brake Industry Co., Ltd., Tokyo (JP)

(72) Inventors: Daisuke Kobayashi, Toyko (JP); Yoshihiro Hirata, Tokyo (JP); Yasuaki Ogawa, Tokyo (JP)

(73) Assignee: Akebono Brake Industry Co., Ltd., Tokyo (JP)

( * ) Notice: Subject to any disclaimer, the term of this patent is extended or adjusted under 35 U.S.C. 154(b) by 119 days.

(21) Appl. No.: 13/723,885

(22) Filed: Dec. 21, 2012

(65) Prior Publication Data

US 2013/0161134 A1   Jun. 27, 2013

(30) Foreign Application Priority Data

Dec. 27, 2011 (JP) .................................. 2011-284813

(51) Int. Cl.
  *F16D 65/14*   (2006.01)
  *F16D 65/095*   (2006.01)

(52) U.S. Cl.
  CPC .................................... *F16D 65/095* (2013.01)
  USPC ..................................... 188/73.44; 188/73.45

(58) Field of Classification Search
  USPC ............... 188/73.44, 73.45, 73.31, 72.4, 72.3
  See application file for complete search history.

(56) References Cited

U.S. PATENT DOCUMENTS

| 4,265,340 A * | 5/1981 | Scott et al. .................. 188/73.44 |
| 4,331,221 A * | 5/1982 | Evans et al. ................. 188/73.44 |
| 5,730,258 A * | 3/1998 | Evans .......................... 188/73.44 |
| 2004/0188191 A1 * | 9/2004 | Lintner ....................... 188/73.45 |
| 2008/0070706 A1 | 3/2008 | Compau et al. |
| 2009/0260928 A1 * | 10/2009 | Baumgartner et al. .... 188/73.44 |

FOREIGN PATENT DOCUMENTS

| JP | 6-065632 | 9/1994 |
| JP | 2006-038164 | 2/2006 |
| JP | 4425737 B2 | 3/2010 |
| JP | 2011-208769 | 10/2011 |

* cited by examiner

*Primary Examiner* — Melanie Torres Williams
(74) *Attorney, Agent, or Firm* — Drinker Biddle & Reath LLP (57) ABSTRACT

A disc brake apparatus includes a boot including a fitting part. A slide pin is fixed to one of a support and a caliper and is slidably mounted to a guide hole formed in the other. Convex parts extending in a sliding direction of the slide pin are circumferentially arranged on an inner periphery of the fitting part. Concave recesses are respectively formed between the neighboring convex parts. Each of the convex parts is formed with at least one a low-height portion and a high-height portion in an axial direction of a rotor, respectively. Positions of the low-height portion and the high-height portion in a circumferential direction of the rotor are respectively different between the adjacent convex parts. The high-height portion has a height so as to contact the slide pin, and the low-height portion has a height so as not to contact the slide pin.

5 Claims, 8 Drawing Sheets

DISC BRAKE APPARATUS

BACKGROUND

The invention is related to a disc brake apparatus. And more particularly, the invention is related to a disc brake apparatus adopting a pin slide type referred to as a floating type.

A disc brake apparatus can be classified into a type having a piston only at an inner side of a caliper for pressing a brake pad and a type having pistons at both inner and outer sides thereof.

The former type is a disc brake apparatus referred to as a floating type and has a configuration in which the caliper itself moves in an axial direction of a rotor from a support fixed to a vehicle, which is a basic point. On the other hand, the latter type is a disc brake apparatus referred to as an opposed type and has a configuration in which the caliper itself is fixed and both an inner brake pad and an outer brake pad are directly pressed by pistons provided at the inside.

In the floating-type disc brake apparatus, a pin slide type is adopted regarding the moving of the caliper from the support, in many cases. As an example of the pin slide type, a slide pin is fixed into a through-hole of an arm extending to both a rotation-in side and a rotation-out side of a rotor from a main body of the caliper and the slide pin is inserted and slid relative to a guide hole having a pocket shape formed in a support.

In the disc brake apparatus adopting the above type, a boot made of elastic resin is provided between the slide pin, the guide hole and an entrance, as disclosed in Patent Documents 1 and 2. The boot prevents an impact sound, which is caused due to contact between the slide pin and the guide hole and is referred to as pin rattle, and suppresses drag of a brake pad.
[Patent Document 1] JP-U-6-65632
[Patent Document 2] JP-B-4425737

In the floating-type disc brake apparatus, it is necessary to enable the air to flow into and out of an extra space in the guide hole so as not to disturb the sliding of the slide pin. Therefore, it is general to form the evenness for passing the air on an inner periphery of the boot. However, the boot disclosed in Patent Document 1 blocks an axial end portion of a recess formed on the inner periphery of the boot so as to hold grease in the recess. Due to this, it is difficult for the air to flow through the recess, so that the sliding of the slide pin is disturbed.

Also, according to the boot disclosed in Patent Document 2, the inner periphery through which the slide pin is inserted is formed with a plurality of convex parts so that the convex parts overlap in a stone wall shape (the convex parts overlap with halves thereof being deviated) in an axial direction the slide pin. By this configuration, a concave portion formed between the convex parts configures a recess for passing the air and prevents the slide pin from falling into the recess. However, according to the boot having the configuration, the mold splitting is difficult and the productivity is poor. Also, when a length of a block in an axial direction is lengthened or the number of blocks is increased so as to suppress the elastic deformation of the slide pin in the axial direction, it is necessary to lengthen an entire axial length of an interference part forming the block and also to lengthen an axial length of the boot. As a result, a layout feature of the caliper or support is deteriorated and a processing range (cutting range) of a mount-side is increased to increase the processing cost.

SUMMARY

It is therefore one advantageous aspect of the present invention to provide a disc brake apparatus having a boot that does not disturb flowing of air upon pin-sliding, prevents a slide pin from falling into in a recess for passing the air, and has a good productivity.

According to one aspect of the invention, there is provided a disc brake apparatus comprising:
a support;
a slide pin;
a caliper, configured to slide from the support through the slide pin in an axial direction of a rotor; and
a boot including a fitting part disposed in a gap between the slide pin and the guide hole, wherein
the slide pin is fixed to one of the support and the caliper and is slidably mounted to a guide hole formed in the other of the support and the caliper,
a plurality of convex parts extending in a sliding direction of the slide pin are circumferentially arranged on an inner periphery of the fitting part,
concave recesses are respectively formed between the neighboring convex parts,
each of the convex parts is formed with at least one a low-height portion and a high-height portion in the axial direction of the rotor, respectively,
positions of the low-height portion and the high-height portion in a circumferential direction of the rotor are respectively different between the adjacent convex parts,
the high-height portion has a height so as to contact the slide pin, and
the low-height portion has a height so as not to contact the slide pin.

The high-height portion of the convex part may be formed at an interference generating part in which a bending of the boot caused due to the fitting into the guide hole is suppressed.

The disc brake apparatus may be configured such that a width of the convex part is equal to or larger than a width of the concave recess in a circumferential direction of the inner periphery of the fitting part.

The high-height portion and the low-height portion of the convex part may be connected by a curved surface.

The high-height portion and the low-height portion of the convex part may be connected by a planar surface.

DETAILED DESCRIPTION OF EXEMPLIFIED EMBODIMENTS

Hereinafter, an embodiment of a disc brake apparatus of the invention will be specifically described with reference to the accompanying drawings. First, an overall configuration of a disc brake apparatus 10 of the invention will be described with reference to FIG. 1 and then a boot 40 that is a characteristic configuration of the invention will be described in details.

Figure 1:
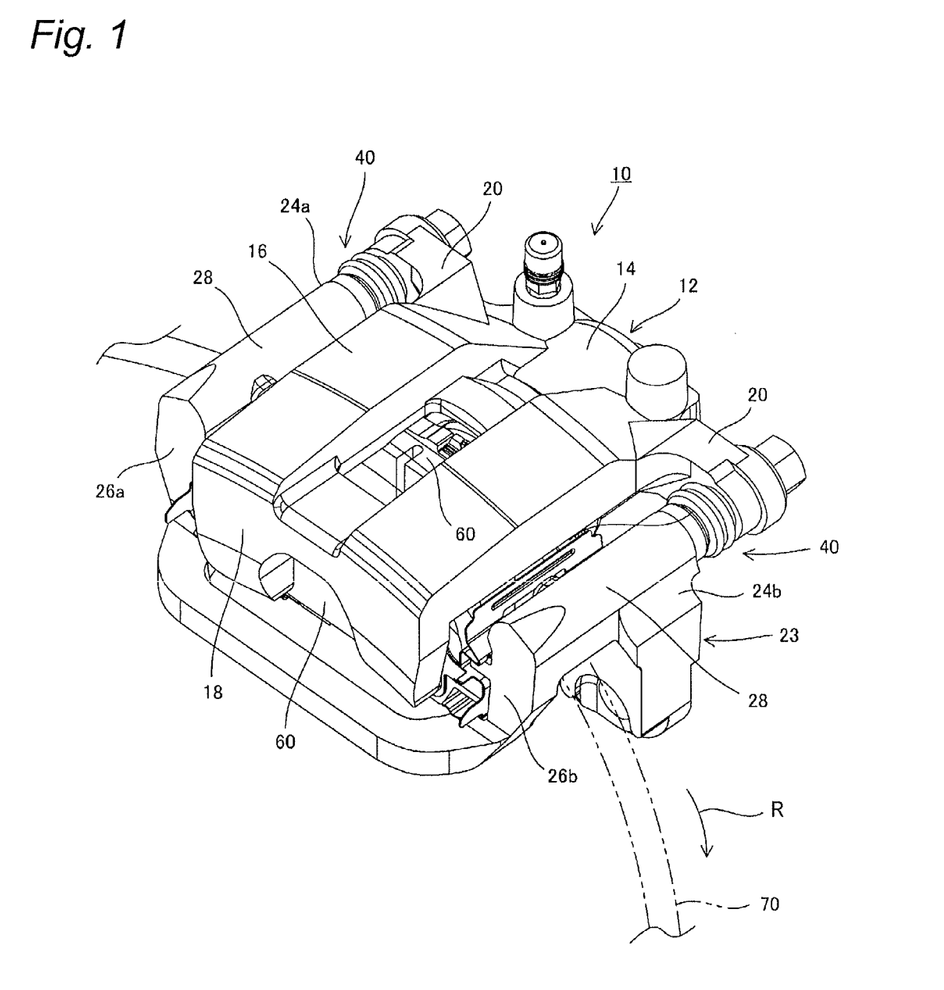
FIG. 1 is a perspective view showing a configuration of a disc brake apparatus according to an embodiment of the invention.

Also, the disc brake apparatus shown in FIG. 1 is an example for illustrating the configuration of the disc brake apparatus 10 of the invention and the configuration of the disc brake apparatus is not limited thereto.

The disc brake apparatus 10 of this embodiment has supports 23, brake pads 60, a caliper 12, boots 40 and a rotor 70. The rotor 70 rotates in a rotation direction R shown in FIG. 1. The supports 23 are base stands that are fixed to a vehicle. The supports 23 have torque receiving parts 24a, 24b, 26a, 26b for holding the brake pads 60 (which will be specifically described later) at both rotation-in and rotation-out sides of the rotor 70 (which will be specifically described later) and at both inner and outer sides of the rotor 70. The brake pads 60 (which will be specifically described later) are held at the torque receiving parts 24a, 24b, 26a, 26b, so that the brake pads can slidingly move in an axial direction of the rotor.

The torque receiving parts 24a, 24b provided at the inner side of the rotor 70 and the torque receiving parts 26a, 26b provided at the outer side are connected by support bridge parts 28 extending on an outer periphery side of the rotor 70. Also, the respective support bridge part 28 is formed therein with a guide hole 30 (refer to FIG. 2) for inserting a slide pin 36 for slidably supporting the caliper 12 (which will be specifically described later) in the axial direction of the rotor. Also, the guide hole 30 of this embodiment has a pocket shape having a depth equal to or larger than a sliding part of the slide pin 36 and a sliding distance thereof.

The brake pad 60 is a frictional member for holding the rotor 70 to thus generate a frictional force on a sliding surface of the rotor 70. In this embodiment, the brake pads 60 are respectively provided between the pair of torque receiving parts 24a, 24b provided at the inner side of the rotor 70 and between the pair of torque receiving parts 26a, 26b provided at the outer side of the rotor 70.

The caliper 12 is a pressing means that presses the brake pads 60 arranged to the supports 23 to thus press the same to the sliding surface of the rotor 70. The caliper 12 mainly has a caliper main body 14, a claw part 18, a bridge part 16 and arm parts 20. The caliper main body 14 is a moveable part having a piston (not shown) therein. The claw part 18 is a reactive force bearing part that is provided at a position facing the caliper main body 14 through the rotor 70. The bridge part 16 is a part connecting the caliper main body 14 and the claw part 18 and is arranged to extend over the rotor 70. The arm parts 20 extend from the caliper main body 14, which is a base end portion, toward both the rotation-in and rotation-out sides of the rotor 70. A tip of each arm part 20 is formed therein with a through-hole 22 for fixing the slide pin 36 that will be specifically described later. Also, a distance between centers of the mating through-holes 22 formed in the tips of the mating arm parts 20 is made to match a distance between centers of the guide holes 30 of the supports 23.

Figure 2:
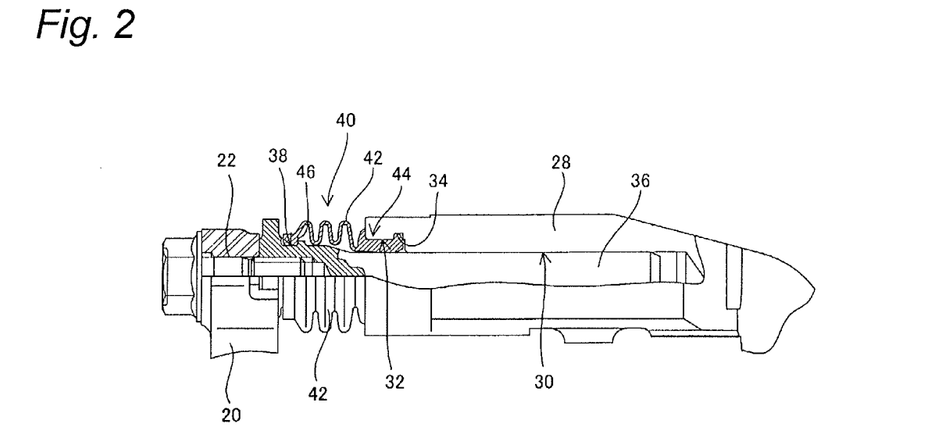
FIG. 2 is a partially enlarged sectional view for illustrating a relation among a guide hole, a slide pin and a boot of the disc brake apparatus.
Figure 3:
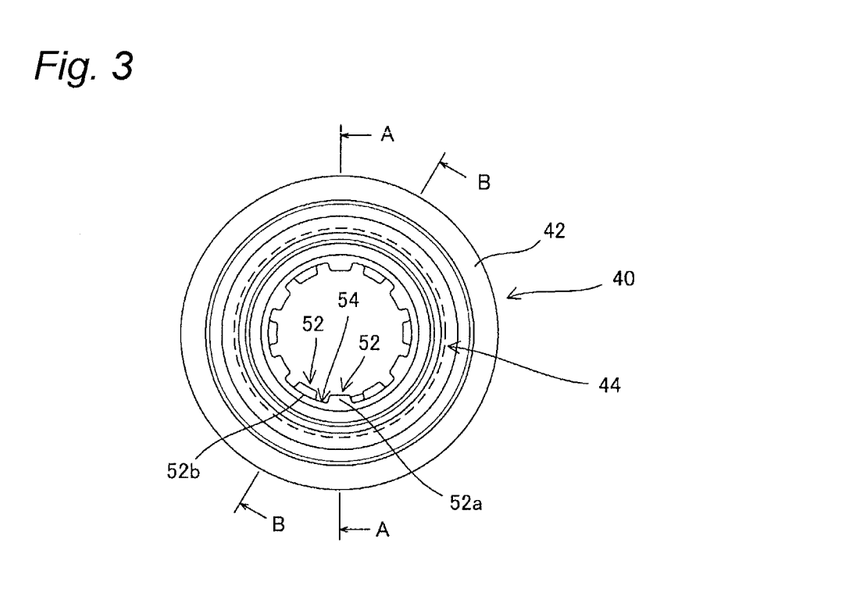
FIG. 3 is a right side view of the boot.
Figure 4:
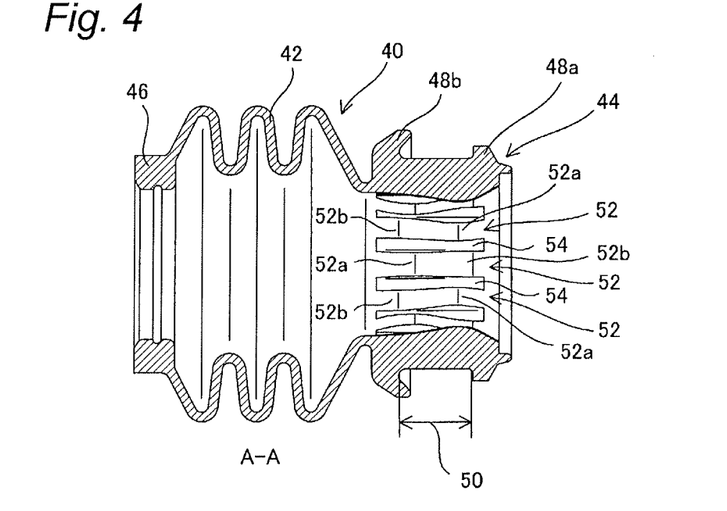
FIG. 4 is a sectional view taken along a line A-A of FIG. 3.
Figure 5:
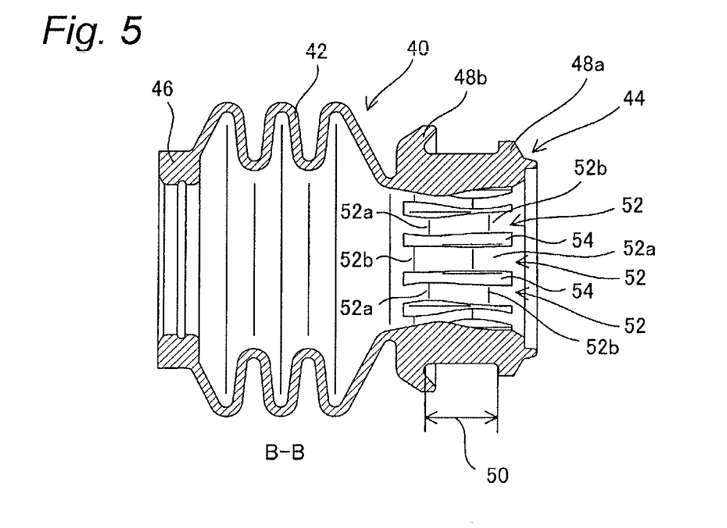
FIG. 5 is a sectional view taken along a line B-B of FIG. 3.

The boot 40 is a dust prevention member that is arranged between an opening of the guide hole 30 of the support 23 and the through-hole 22 of the arm part 20 of the caliper 12 and covers the slide pin 36 to slide. The boot 40 is an elastic member formed of resin (for example, rubber) and a part thereof covering the slide pin 36 has a bellows shape. The bellows part 42 is formed, so that the boot can expand and contract, in response to a distance change between the openings of the arm part 20 and the guide hole 30, which is caused as the slide pin 36 slides.

The rotor 70 is a rotary plate that is fixed to a wheel and has a sliding surface at an outer periphery-side surface.

According to the disc brake apparatus 10 above, when the piston of the caliper main body 14 is pushed out, the brake pad 60 arranged at the inner side of the rotor 70 is pressed to the inner-side sliding surface of the rotor 70. When the inner side brake pad 60 is pressed to the sliding surface, the caliper main body 14 slides in the axial direction of the rotor and toward the inner side of the rotor by the reactive force. When the caliper main body 14 slides toward the inner side of the rotor, the claw part 18 connected by the bridge part 16 is biased toward the outer side of the rotor. Thereby, the brake pad 60 arranged at the outer side of the rotor 70 is pressed and is thus pressed to the sliding surface of the outer side of the rotor.

The boot 40 adapted to the disc brake apparatus 10 above has a guide hole fitting part 44 and a slide pin fitting part 46, in addition to the bellows part 42. The guide hole fitting part 44 is connected to one end of the bellows part 42 to thus fix the boot 40 in the opening of the guide hole 30. As shown in FIGS. 4 to 7, the guide hole fitting part 44 has a pair of flange parts 48a, 48b and an interference part 50 and is formed to be wholly thicker than the bellows part 42. The flange parts 48a, 48b are formed at both end portions of the guide hole fitting part 44 in the sliding direction of the sliding pin 36. The flange parts 48a, 48b are annular projections that protrude in a circular ring shape from an outer periphery of the guide hole fitting part 44. The flange part 48a, which is positioned at a tip-side of the guide hole fitting part 44, performs as a separation preventing part that is fitted into a flange recess 34 formed at a mount part 32 of the guide hole 30 (which will be specifically described later) as shown in FIG. 2. In the meantime, the flange part 48b, which is positioned at a rear end-side of the guide hole fitting part 44, covers an opening end portion of the guide hole 30 to thus prevent the dust from being introduced into the guide hole.

The interference part 50 is formed between the pair of flange parts 48a, 48b and an outer periphery thereof is contacted to an inner periphery of the mount part 32 of the guide hole 30 at a mounted state. By this configuration, it is possible to suppress an amount of deformation of the inside of the interference part 50, thereby suppressing the rattling of the slide pin 36 being sliding.

A plurality of convex parts 52 that is formed in the sliding direction of the slide pin 36, i.e., in the axial direction of the rotor 70 is circumferentially arranged in parallel on an inner periphery of the guide hole fitting part 44. Since the plurality of convex parts 52 is arranged in parallel, concave recesses 54 are respectively formed in the axial direction of the rotor 70 between the neighboring convex parts 52. The concave recesses 54 penetrate the guide hole fitting part 44 in the axial direction of the rotor. Also, in this embodiment, widths of the convex part 52 and the concave recess 54 are configured so that both the widths are the same or the width of the convex part 52 is relatively wider. By this configuration, when a circumferential force is applied to the slide pin 36, the slide pin 36 is suppressed from falling into the concave recess 54 and the rattling (pin rattling) is thus prevented from increasing.

In this embodiment, a height of the convex part 52 in the axial direction of the rotor 72 is changed. Specifically, each convex part 52 has at least one a high-height portion 52a and a low-height portion 52b, respectively. The mating high-height portion 52a and low-height portion 52b are arranged so that the high-height portion 52a and the low-height portion 52b do not overlap in the circumferential direction between the adjacent convex parts 52. In other words, positions of the low-height portion 52b and the high-height portion 52a in a circumferential direction of the rotor 70 are respectively different between the adjacent convex parts 52. Specifically, the high-height portion 52a and the low-height portion 52b are staggered between the adjacent convex parts 52. Here, the high-height portion 52a indicates a portion whose vertex part and a neighboring part thereof are brought into contact with the outer periphery of the slide pin 36 when mounting the slide pin 36. Also, the low-height portion 52b indicates the lowest part and a neighboring part thereof of a portion that is not contacted to the slide pin 36 even when mounting the slide pin 36.

In addition to the above configuration, in this embodiment, the high-height portion 52a of the convex part 52 is formed within a range of the interference part 50 having the axial length of the rotor 70. By this configuration, it is possible to suppress the high-height portion 52a contacting the slide pin 36 from being deformed, thereby suppressing the rattling (pin rattling) of the slide pin 36 in the circumferential direction of the rotor.

Also, in this embodiment, the high-height portion 52a and the low-height portion 52b are connected by a curved surface having an arc shape. By this configuration, only the single convex part 52 exists in the axial direction of the slide pin 36, so that the mold splitting ability is improved. Also, the curved surface of the connection surface can contribute to the improvement on the mold splitting ability. The curved surface is curved when seen from a direction (not shown) perpendicular to the axial direction of the rotor. Preferably, the curved surface is curved when seen from the circumferential direction of the guide hole fitting part 44. This is because there is no step between the high-height portion 52a and the low-height portion 52b. Thereby, it is possible to favorably keep the productivity of the boot 40. Specifically, according to the above configuration, when splitting a mold, it is possible to simply pull out the boot 40 from the mold. Compared to this, when a convex part has a step or a recess in a direction intersecting with the axial direction of the rotor, it is difficult to pull out the boot from the mold. Thus, the additional processes such as air separation and expansion are necessarily required, so that the productivity is lowered. According to the boot 40 of this embodiment, it is possible to omit the additional processes, so that it is possible to favorably keep the productivity.

Figure 6:
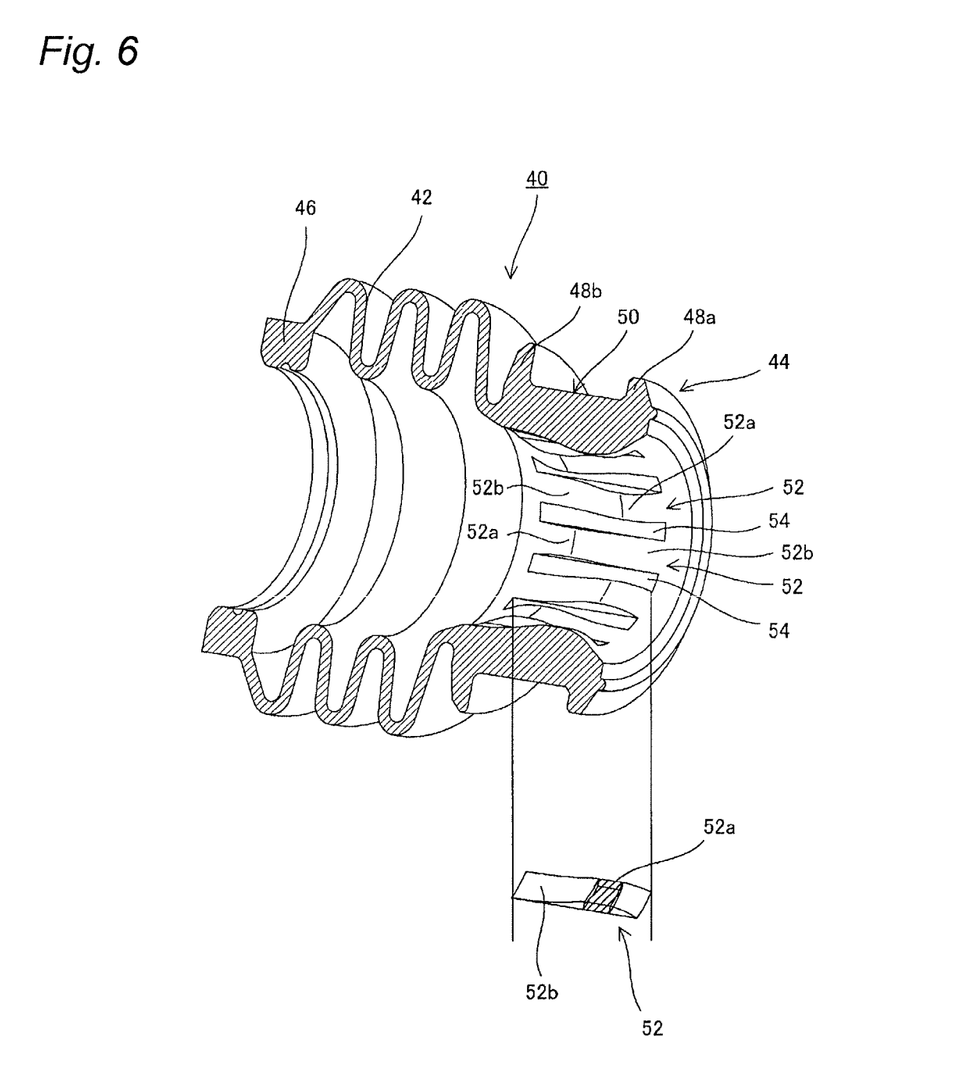
FIG. 6 is a partially sectional perspective view of the boot, which shows a partially cut state of a convex part.
Figure 7:
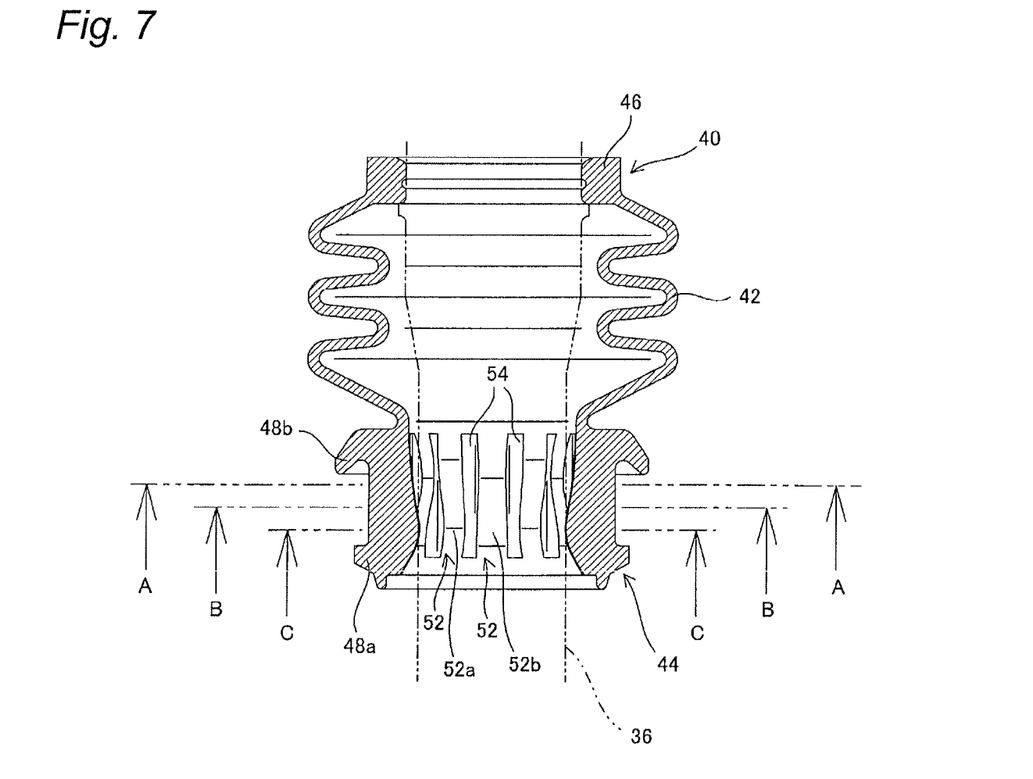
FIG. 7 is a sectional plan view of the boot.
Figure 8:
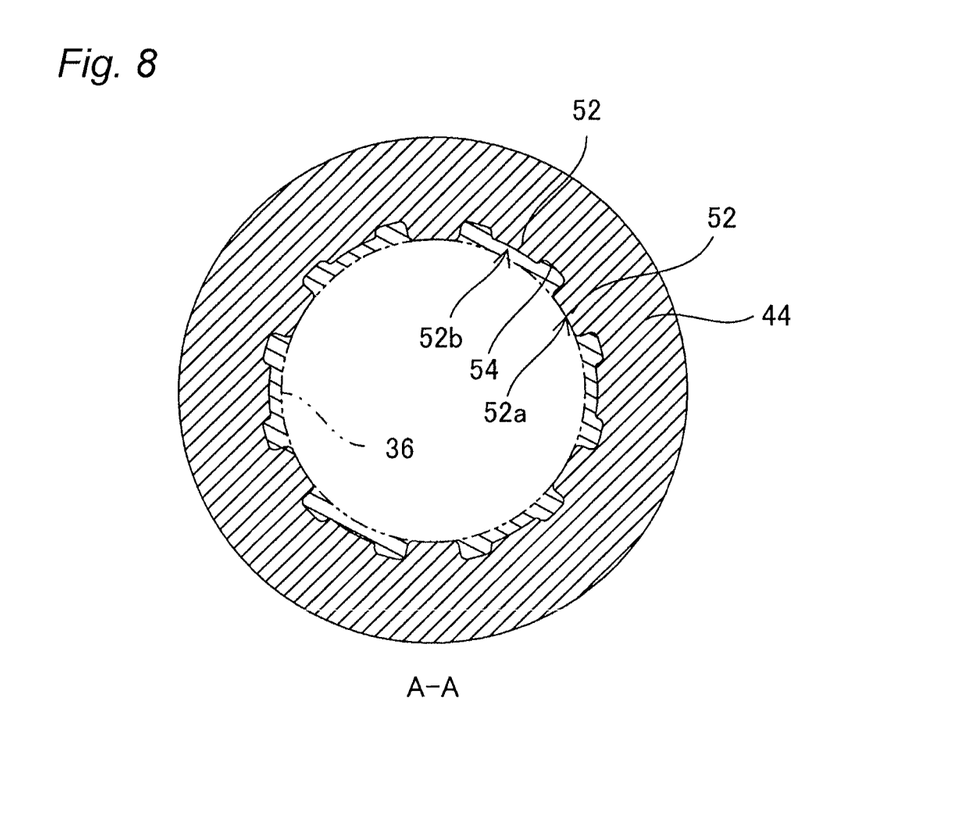
FIG. 8 is a sectional view of the boot taken along a line A-A of FIG. 7.
Figure 9:
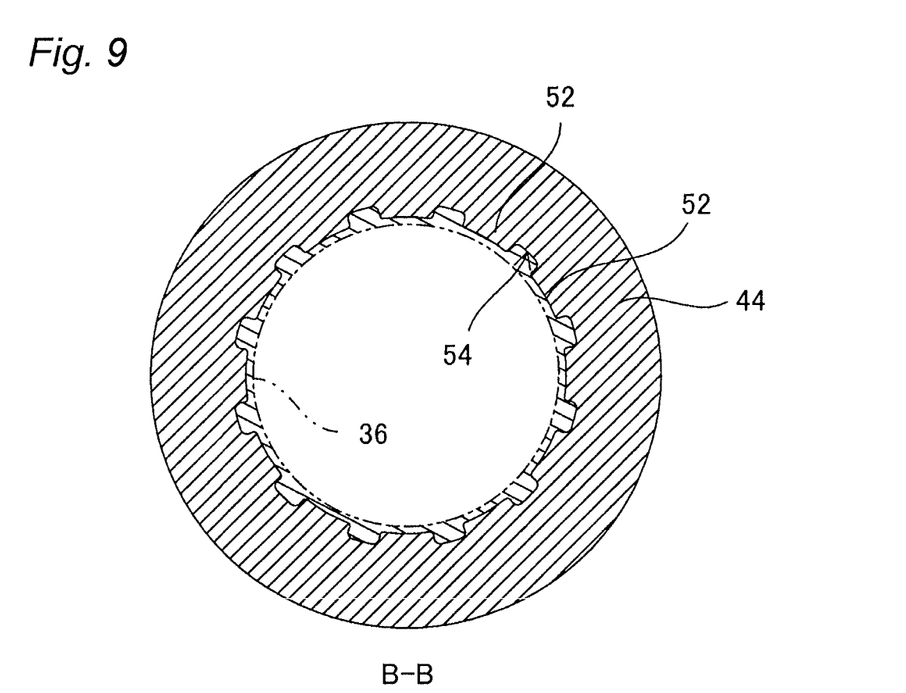
FIG. 9 is a sectional view of the boot taken along a line B-B of FIG. 7.
Figure 10:
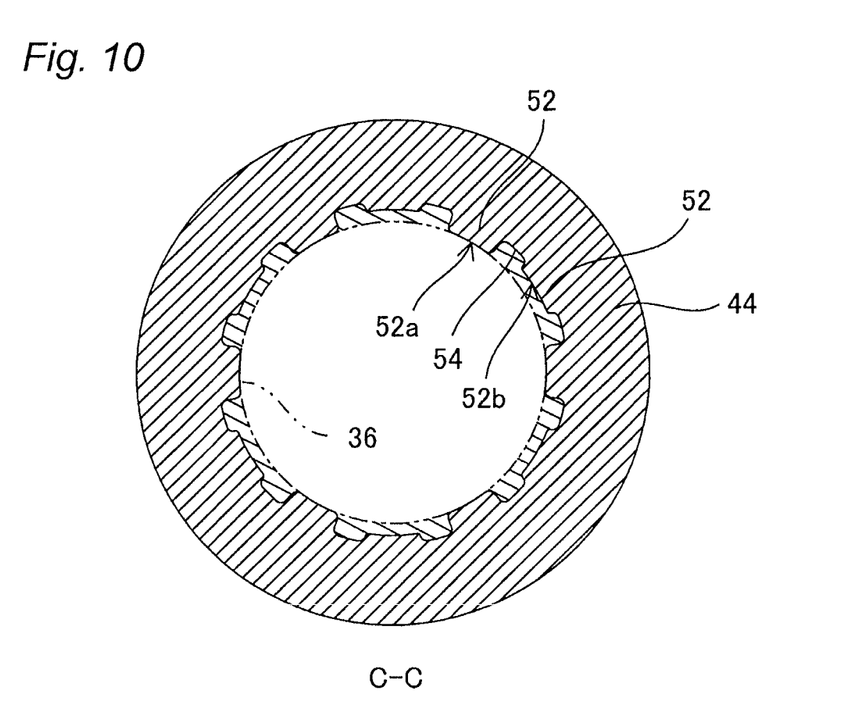
FIG. 10 is a sectional view of the boot taken along a line C-C of FIG. 7.

Also, by the above configuration, as shown with oblique lines in a partially sectional view of the convex parts 52 in FIG. 6, the slide pin 36 and the convex part 52 are contacted only at the adjacent part of the high-height portion 52a and are not contacted at the low-height portion 52b, at a normal state. Regarding this, in FIG. 7, the end faces taken along a position (A-A) corresponding to the high-height portion at the rear end-side of the convex part 52, a position (C-C) corresponding to the high-height portion at the tip-side and a central position (B-B) are shown in FIGS. 8, 9 and 10, respectively.

Here, when the force supporting the slide pin 36 is considered as a spring constant K of a block, the spring constant K can be expressed as follows.

[equation 1]

$$K = E \times \left(\frac{a \times b}{h}\right) \quad \text{(equation 1)}$$

Also, in the equation 1, E is a Young's modulus, a is a width of a contact surface with the slide pin 36 (i.e., a width of the convex part 52), b is a length of the contact surface with the slide pin 36 and h is a height of the convex part 36 to the contact surface with the slide pin 36. Hence, as described above, even when the length b of the contact surface is shortened as a ratio of the width a of the convex part 52 is increased, it is possible to the spring constant equivalent to the conventional spring constant.

Also, referring to FIGS. 8 to 10, it can be seen from any sectional end view that the flowing passage of the air is secured even at a location other than the concave recess 54. Therefore, even when a relative ratio of the opening width of the concave recess 54 to the width of the convex part 52 is made to be small, it is possible to secure the large area of the flowing passage of the air in the respective sectional end faces.

Therefore, even when the configuration is adopted in which the width of the concave recess 54 is made to small and the slide ping 36 is thus prevented from falling into the concave recess 54, there is no concern that the flowing of the air passing through the guide hole fitting part 44 is disturbed. Hence, there is no concern that the drag of the brake (brake pad 60) occurs due to the disturbance of the air flowing.

The slide pin fitting part 46 is connected to the other end of the bellows part 42 to thus fix the boot 40 to the base end portion of the slide pin 36 fixed to the tip of the arm part 20. The shape of the slide pin fitting part 46 is not particularly limited. However, the sliding pin fitting part preferably has preferably an annular protrusion shape that is thickened toward the inner periphery of the boot 40 so that it can be fitted into the concave recess 38 of the base end portion of the slide pin 36.

In order to adopt the boot 40 having the above configuration, according to the disc brake apparatus 10 of this embodiment, the opening of the guide hole 30 is provided with the mount part 32 and the base end portion of the slide pin 36 is formed with the concave recess 38 for mount.

The mount part 32 is a part for mounting the guide hole fitting part 44 of the boot 40, is made to have a larger diameter than the sliding part of the guide hole 30 and forms the flange recess 34 at a boundary with the sliding part.

Also, in the above embodiment, it is shown that the single convex part 52 is formed with only one high-height portion 52a. However, in the disc brake apparatus 10 of this embodiment, the number of the high-height portions 52a to be formed at the convex part 52 may be plural. Even in this configuration, the high-height portions 52a do not overlap in the circumferential direction between the adjacent convex parts 52, so that it is possible to secure the sufficient area for the air flowing in the respective end faces and to suppress the rattling of the guide pin.

Also, in the above embodiment, the high-height portion 52a and the low-height portion 52b are connected by the curved surface having an arc shape, when seen from the side. However, the high-height portion 52a and the low-height portion 52b may be connected by planar surface, when seen from the side (when seen from an arrow direction intersecting with the axial direction of the rotor).

Even in the above configuration, it is possible to realize the same effects as the curved surface.

According to the invention, it is possible to suppress the bending (relief) of the high-height portion of the convex part and to suppress the rattling of the slide pin.

According to the invention, it is possible to effectively suppress the slide pin from falling into the concave recess.

According to the invention, the convex part does not have a step in the axial direction of the rotor, so that the favorable mold splitting ability is obtained. Therefore, it is possible to effectively improve the productivity of the boot.

In view of the above, The disc brake apparatus having the above features does not disturb the flowing of the air upon pin-sliding and can suppress the slide pin from falling into the concave recess for passing the air. Also, according to the above configuration, since the concave recess is not provided in the direction intersecting with the axial direction of the rotor, it is possible to keep the favorable productivity.

What is claimed is:

1. A disc brake apparatus comprising:
    a support;
    a slide pin;
    a caliper, configured to slide from the support through the slide pin in an axial direction of a rotor; and
    a boot including a fitting part disposed in a gap between the slide pin and the guide hole, wherein
    the slide pin is fixed to one of the support and the caliper and is slidably mounted to a guide hole formed in the other of the support and the caliper,
    a plurality of convex parts extending in a sliding direction of the slide pin are circumferentially arranged on an inner periphery of the fitting part,
    concave recesses are respectively formed between the neighboring convex parts,
    each of the convex parts is formed with at least one a low-height portion and a high-height portion in the axial direction of the rotor, respectively,
    positions of the low-height portion and the high-height portion in a circumferential direction of the rotor are respectively different between the adjacent convex parts,
    the high-height portion has a height so as to contact the slide pin, and
    the low-height portion has a height so as not to contact the slide pin.

2. The disc brake apparatus according to claim 1, wherein the high-height portion of the convex part is formed at an interference generating part in which a bending of the boot caused due to the fitting into the guide hole is suppressed.

3. The disc brake apparatus according to claim 1, wherein a width of the convex part is equal to or larger than a width of the concave recess in a circumferential direction of the inner periphery of the fitting part.

4. The disc brake apparatus according to claim 1, wherein the high-height portion and the low-height portion of the convex part are connected by a curved surface.

5. The disc brake apparatus according to claim 1, wherein the high-height portion and the low-height portion of the convex part are connected by a planar surface.

* * * * *